United States Patent
Mulhern et al.

(10) Patent No.: US 7,370,044 B2
(45) Date of Patent: May 6, 2008

(54) SYSTEM AND METHOD FOR MANAGING AND UPDATING INFORMATION RELATING TO ECONOMIC ENTITIES

(75) Inventors: Robert Kelly Mulhern, Suwanee, GA (US); James Crawford Redman, Jackson, GA (US); David J. Karas, Duluth, GA (US); Markus R. Satterfield, Alpharetta, GA (US)

(73) Assignee: Equifax, Inc., Atlanta, GA (US)

( * ) Notice: Subject to any disclaimer, the term of this patent is extended or adjusted under 35 U.S.C. 154(b) by 180 days.

(21) Appl. No.: 09/992,809

(22) Filed: Nov. 19, 2001

(65) Prior Publication Data

US 2003/0097380 A1    May 22, 2003

(51) Int. Cl.
*G06F 17/30* (2006.01)
(52) U.S. Cl. .......................... 707/6; 707/100; 707/200
(58) Field of Classification Search ................. 707/10, 707/100, 102, 203, 200, 202, 201, 204, 1, 707/6
See application file for complete search history.

(56) References Cited

U.S. PATENT DOCUMENTS

| | | | |
|---|---|---|---|
| 4,947,028 A | 8/1990 | Gorog | |
| 5,274,547 A | 12/1993 | Zoffel et al. | |
| 5,303,149 A | 4/1994 | Janigian | |
| 5,305,196 A | 4/1994 | Deaton et al. | |
| 5,388,255 A | 2/1995 | Pytlik et al. | |
| 5,390,359 A | 2/1995 | Damerau | |
| 5,497,486 A | 3/1996 | Stolfo et al. | |
| 5,659,731 A | 8/1997 | Gustafson | |
| 5,675,662 A | 10/1997 | Deaton et al. | |
| 5,710,922 A | 1/1998 | Alley et al. | |
| 5,717,915 A | 2/1998 | Stolfo et al. | |
| 5,734,898 A | 3/1998 | He | |
| 5,787,415 A | 7/1998 | Jacobson et al. | |
| 5,799,302 A | 8/1998 | Johnson et al. | |
| 5,819,291 A * | 10/1998 | Haimowitz et al. | ......... 707/201 |
| 5,857,206 A | 1/1999 | Tsutsumitake | |
| 5,878,403 A | 3/1999 | DeFrancesco et al. | |
| 5,911,141 A | 6/1999 | Kelley et al. | |
| 5,926,816 A | 7/1999 | Bauer et al. | |
| 5,937,405 A | 8/1999 | Campbell | |
| 5,950,210 A | 9/1999 | Nelson | |
| 5,960,430 A | 9/1999 | Haimowitz et al. | |
| 5,978,805 A | 11/1999 | Carson | |
| 5,995,980 A | 11/1999 | Olson et al. | |
| 6,029,175 A | 2/2000 | Chow et al. | |
| 6,061,678 A | 5/2000 | Klein et al. | |

(Continued)

OTHER PUBLICATIONS

Patent Abstracts of Japan, vol. 2000, No. 12, Jan. 3, 2001 and JP 2000 250795 A (Hitachi Ltd.), Sep. 14, 2000 abstract, Japan.

*Primary Examiner*—Greta L Robinson
(74) *Attorney, Agent, or Firm*—Kilpatrick Stockton LLP

(57) ABSTRACT

Methods and systems for managing and updating information relating to economic entities using sets of unique identifiers. A universe database contains record entries. Each of the record entries is associated with a unique universe identifier. A customer database contains customer record entries. Each customer record entry is associated with a unique customer identifier. A conversion table provides a mapping between the unique universe identifiers and the unique customer identifiers. The information contained in the customer database is updated using the unique universe identifiers, unique customer identifiers and the conversion table. The unique universe identifiers and the unique customer identifiers are stable over a period of time.

14 Claims, 4 Drawing Sheets

U.S. PATENT DOCUMENTS

| | | | |
|---|---|---|---|
| 6,073,140 A * | 6/2000 | Morgan et al. ............. 707/203 |
| 6,081,805 A | 6/2000 | Guha |
| 6,131,101 A | 10/2000 | Maitino et al. |
| 6,138,152 A | 10/2000 | Jalote et al. |
| 6,154,748 A | 11/2000 | Gupta et al. |
| 6,202,053 B1 | 3/2001 | Christiansen et al. |
| 6,226,650 B1 | 5/2001 | Mahajan et al. |
| 6,237,008 B1 | 5/2001 | Beal et al. |
| 6,243,718 B1 | 6/2001 | Klein et al. |
| 6,289,352 B1 * | 9/2001 | Proctor ...................... 707/102 |
| 6,397,228 B1 * | 5/2002 | Lamburt et al. ............. 707/203 |
| 6,405,208 B1 * | 6/2002 | Raghavan et al. .......... 707/102 |
| 6,415,289 B1 * | 7/2002 | Williams et al. ............... 707/10 |
| 6,490,593 B2 * | 12/2002 | Proctor ...................... 707/102 |
| 6,633,879 B1 * | 10/2003 | Jeffries ....................... 707/100 |
| 6,651,070 B1 * | 11/2003 | Hirashima et al. .......... 707/102 |
| 6,697,822 B1 * | 2/2004 | Armatis et al. ............. 707/102 |
| 6,766,327 B2 * | 7/2004 | Morgan et al. ............. 707/101 |
| 2001/0037333 A1 | 11/2001 | Nishimura |

* cited by examiner

SYSTEM AND METHOD FOR MANAGING AND UPDATING INFORMATION RELATING TO ECONOMIC ENTITIES

TECHNICAL FIELD

This invention relates to managing and updating a massive amount of information relating to economic entities and providing information requested by an information buyer to the information buyer, and, in particular, to efficiently providing the requested information using two sets of unique identifiers.

BACKGROUND OF THE INVENTION

The present invention relates to managing and processing massive amounts of information regarding virtually each and every participant in today's economy. A significant part of today's economy relies on information provided by information suppliers, those who gather and process raw data and provide processed information regarding an economic entity to information buyers. As an example, an information supplier gathers data regarding a consumer and sells processed information to an information buyer. An information buyer uses the processed information to identify potential customers of its products and to shape and target its marketing strategies. Examples of information buyers include credit companies, retailers, manufacturers and service providers.

An information supplier provides information according to criteria specified by an information buyer. One information buyer may only need addresses and names of its potential customers. Another information buyer may wish to know the type of food and clothing a potential customer prefers, in addition to the customer's name and address. A third information buyer may wish to know the potential customer's marital status, income and assumed debts.

Traditional methods of supplying processed information are labor intensive and require tremendous processing capability and time. In general, traditional methods involve a step of comparing the content of an information buyer's customer file to the content in the information supplier's file. Comparing data contents requires a batch processing and presents a substantially difficult task. Information about a particular person is often captured in various forms, requiring various steps to standardize an information buyer's customer file. For example, even a person's name may have been entered in the customer's files in three or four different ways. In addition, the amount of information available regarding an individual exploded with advancements made in computer and information technologies, presenting a daunting amount of information to be handled and managed.

Traditional methods also often fragmented databases of an information buyer according to the buyer's business units and geographical locations of the buyer's sub-units. In other words, an information buyer's customer file was often stored in a fragmented way, thereby preventing the information buyer from having an integrated view of its customers. A corporation cannot provide the most efficient services to its customers when it only has fragmented views of its customers and cannot access all information it has regarding a particular customer. For example, a regular customer of a corporation does not regard the corporation based on its different business units and is likely to be frustrated when a unit of the corporation cannot access the customer's file when the customer has been dealing for a number of years with another unit of the corporation.

In addition, new digital infrastructures such as the Internet and wireless communications brought about capability to distribute information in an amazing speed to almost every location on the globe. Accordingly, customers of information buyers expect high quality services in near real-time. In turn, information buyers expect information suppliers to deliver high quality information in near real-time. At the same time, the digital revolution brought about vast capability to gather astounding amounts of information regarding every economically active person, either natural or legal. Information buyers expect information suppliers to be able to gather, process and deliver enormous amounts of information in near real-time.

An information supplier such as Acxiom Corporation ("Acxiom") attempts to meet the challenges in the digital age by using a plurality of persistent keys that link the record entries of information buyers with the record entries in its central database. U.S. Pat. No. 6,073,140 assigned to Acxiom, which patent is incorporated herein by this reference, discloses an open system in which an information buyer's databases are updated using a plurality of persistent keys and version numbers. A version number associated with a persistent key is updated each time the content in Acxiom's central database associated with the persistent key is updated. An information buyer's database becomes updated when the buyer's version number differs from the version number in Acxiom's central database with respect to the same persistent key.

SUMMARY OF INVENTION

The present invention provides systems and methods for managing and updating massive amounts of information relating to economic entities. An information supplier's universe database includes record entries, which are subject to change. Each record entry is associated with a unique universe identifier ("UUID"). A record entry can contain all information regarding a particular economic entity, including, among others, the address, the telephone number, marital status and credit history. A UUID is stable over time, thus can be used to link raw data generated by an economic entity and which raw data are subject to change.

When an information buyer transfers its customer database to the information supplier to update its database, the supplier assigns a set of unique customer identifiers ("UCID's") to each record entry in the customer's database. A UCID is assigned to each and every record entry contained in the customer's database regardless of whether a record entry corresponds to an existing economic entity. The UCID is stable over a period of time, and each of the customer record entries is organized per person. Accordingly, each of the UCID's can be used to link separate data generated over time regarding a particular customer of an information buyer.

The supplier also creates a conversion table or other desired functionality for associating, mapping, linking, or correlating (hereinafter "associating") the UCID's and UUID's. The supplier then uses the UUID's, UCID's and the associating functionality to efficiently transfer information desired by an information buyer and referenced by a UCID. The supplier assigns a set of UCID's per information buyer. Each buyer has its unique set of UCID's. Accordingly, integrity of data per customer database belonging to an information buyer is facilitated.

An information supplier keeps track of enormous amounts of information relating to virtually every economic entity generating raw data within a defined universe. A UUID, which is preferably stable over time, facilitates management of information by providing a way to link separate and modular data inputs regarding a particular economic entity. Similarly, a UCID, which is preferably stable over time, allows a way to link different sets of information regarding a particular customer of an information buyer. A set of UCID's enables an information buyer to have an integrated view of each and every of its customers. Furthermore, the UCID's allow the information buyer to transmit only its UCID's or a subset thereof to the information supplier when the buyer wishes to update its customer record entries. Accordingly, the present invention reduces the amount of data that needs to be handled or transmitted from an information buyer to an information supplier.

For certain time-critical information, the present invention provides a way to update such information in near real-time. An information buyer can transmit via the Internet or a wireless communication link, the UCID associated with the time-critical information. The information supplier can find the corresponding UUID using the UCID and the associating functionality. The supplier can update the content requested by the buyer via the Internet or another real-time communication link.

The use of two sets of unique identifiers provides a way to decouple the information buyer's customer file and the information supplier's universe file. This decoupling provides several advantages. Among them are that it prevents inadvertent contamination of information between the customer database and the universe database. The universe database includes highly sensitive information, such as credit information and other regulated information. The decoupling provides a ways to prudently control highly sensitive information. In addition, the decoupling provides a way to protect against information theft. The decoupling also reduces the chance that one buyer will accidentally obtain access to another buyer's information.

DETAILED DESCRIPTION

Figure 1:
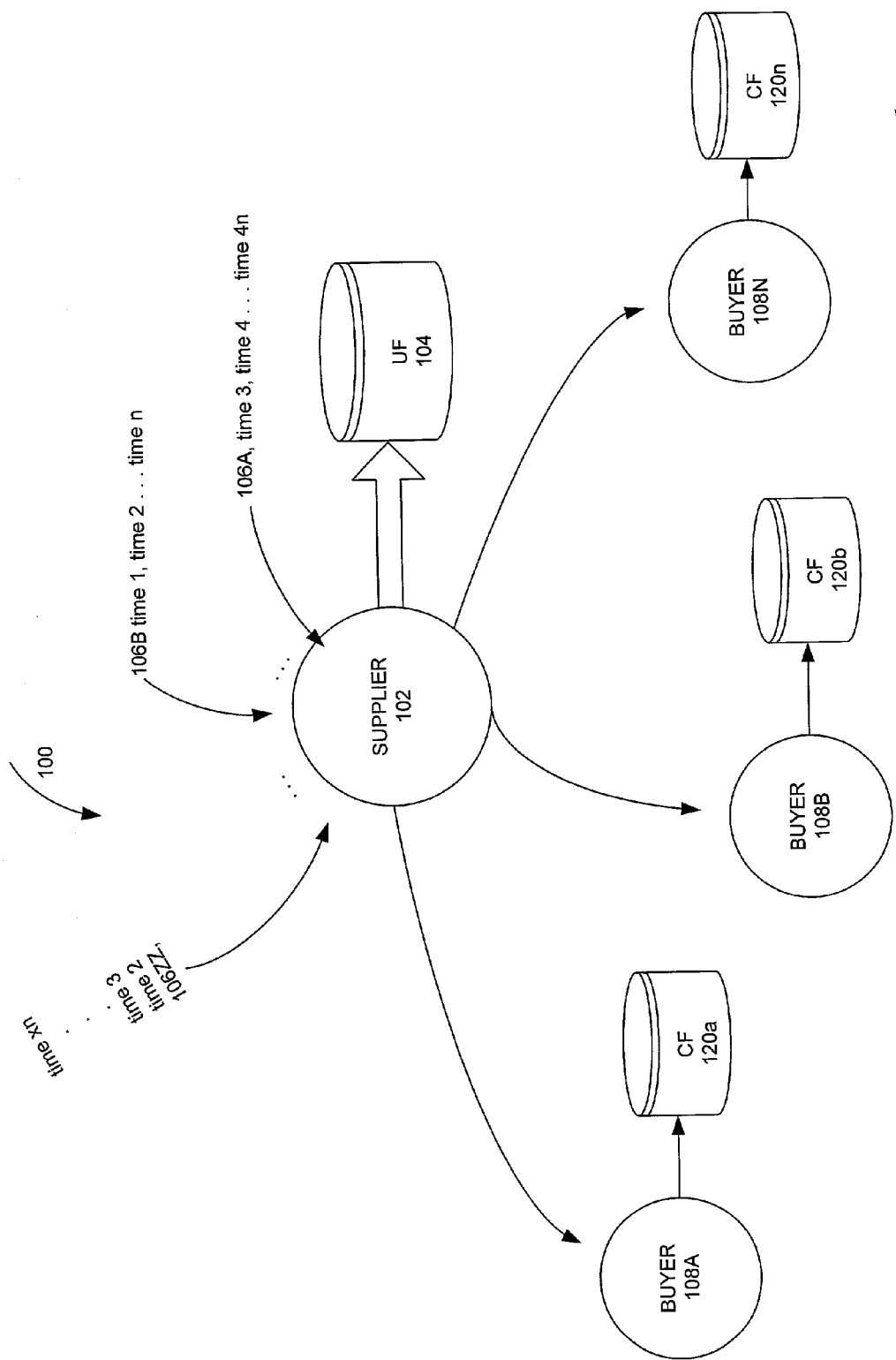
FIG. 1 is an overview of a preferred system embodiment of the present invention.

Referring to FIG. 1, an overview of an exemplary process 100 involved in gathering, updating and processing information regarding an economic entity is described. An information supplier 102 keeps a universe file ("UF") 104 that can contain a record entry for each entity that generates raw data in a universe X. For example, a universe X may comprise the United States. The supplier gathers raw data relating to each economic entity, 106A through 106ZZ. The supplier then processes the raw data and stores the processed information relating to each economic entity in universe X.

Each record entry for an economic entity can be associated with a unique universe identifier ("UUID"). The UUID is preferably stable over time. In other words, all and every information concerning an entity can be referenced and accessed by using a UUID associated with the entity regardless of time and geographical location. For example, if an entity 106A installs a telephone line at time X and the entity assumes a mortgage at a later time Y, the supplier can receive information relating to these events and both these events can be referenced using the same UUID. As another example, if the entity 106A buys a house in location Y and buy a car in location Z, the supplier can gather information relating to these events and both of these events can be referenced using the same UUID. A record entry can contain all information relating to an economic entity, including, among others, the name, address, telephone number, utility bill payment history and credit history. A record entry can include a plurality of data files. The UUID can be assigned as appropriate, per economic entity, per record entry, or per any other desirable data trait. A preferred embodiment assigns the UUID per entity.

The use of UUID's, which is preferably stable over a period of time and assigned preferably per entity, facilitates management and integration of information regarding an economic entity. Raw data relating to an economic entity is subject to change. For example, a person's address, name, telephone names, e-mail address, and marital status may change over time. Furthermore, a person's certain traits may manifest for a short time period then disappear. For example, a person may become fanatical over chocolate ice cream and buy gallons of ice cream every week, then develop a distaste for chocolate ice cream. The person may then develop another interest. The UUID's provide a way to link all information relating to an entity regardless of time and space. They also provide a way to avoid fragmentation of information relating to an entity. Similarly, the UUID's provide safeguards against loss of information regarding an economic entity. All information regarding an entity can be integrated, analyzed and modeled to provide a holistic market benchmark for the particular person.

The supplier 102 provides information to a plurality of information buyers, commonly designated as 108. For example, an information buyer 108*a* may be a manufacturer of bicycles and may buy a list of customers who are potential buyers of bicycles. The supplier delivers a customer file ("CF") 120*a* to the information buyer 108*a*. Similarly, an information buyer 108*b* may be a credit company and buy a list of customers who are potential consumers of its services. The supplier 102 delivers a CF 120*b* to the information buyer 108*b*.

In general, a CF includes a subset of the information included in the UF. There are several reasons for this. An information buyer 108*a* may be geographically limited and therefore not wish to obtain information on someone who is not residing in a specified locality. Another buyer may be interested in obtaining information regarding entities who are natural persons and are under the age of thirty-five ("35"). Yet another buyer may also be interested in only those entities whose behavior indicates that they would be good credit card customers. Still another buyer may need only parts of the information kept in the UF on each entity. In any event, the supplier identifies the content to be delivered in a CF file according to the information buyer's specifications.

Each record entry in a CF can be assigned with a unique customer identifier ("UCID"). A UCID can be assigned to every customer record entry regardless of whether the record entry identifies an economic entity. For example, the CF 120*a* may include old or corrupted data and thus include a record entry that may not correspond to an economic entity constituting a potential customer for the information buyer 108*a*. Regardless, a UCID can be assigned for each and every customer record entry in a CF. A UCID is preferably stable over time. Accordingly, a UCID provides a way to link separate data inputs generated at different times and at different locations and yet relating to the record entry corresponding to the same UCID.

The supplier 102 can assign a different set of UCID's per information buyer. A set of UCID's used for a CF belonging to the buyer 108A is, therefore, preferably different from a set of UCID's used for a CF belonging to the buyer 108B. The use of different sets of UCID's per information buyer provides capability to protect proprietary information belonging to each information buyer. The use of different sets of UCID's also provides capability to avoid unintended dilution or expansion of information contained in a CF of a particular information buyer. Furthermore, using different sets of UCID's for different customers avoids the security issues and other numerous problems associated with the previously discussed persistent key approach where different buyers are using the same key to access the same record entry. For example, the supplier can change periodically a set of UCID's belonging to an information buyer, thereby providing an increased security for information contained in the buyer's CF.

Figure 2:
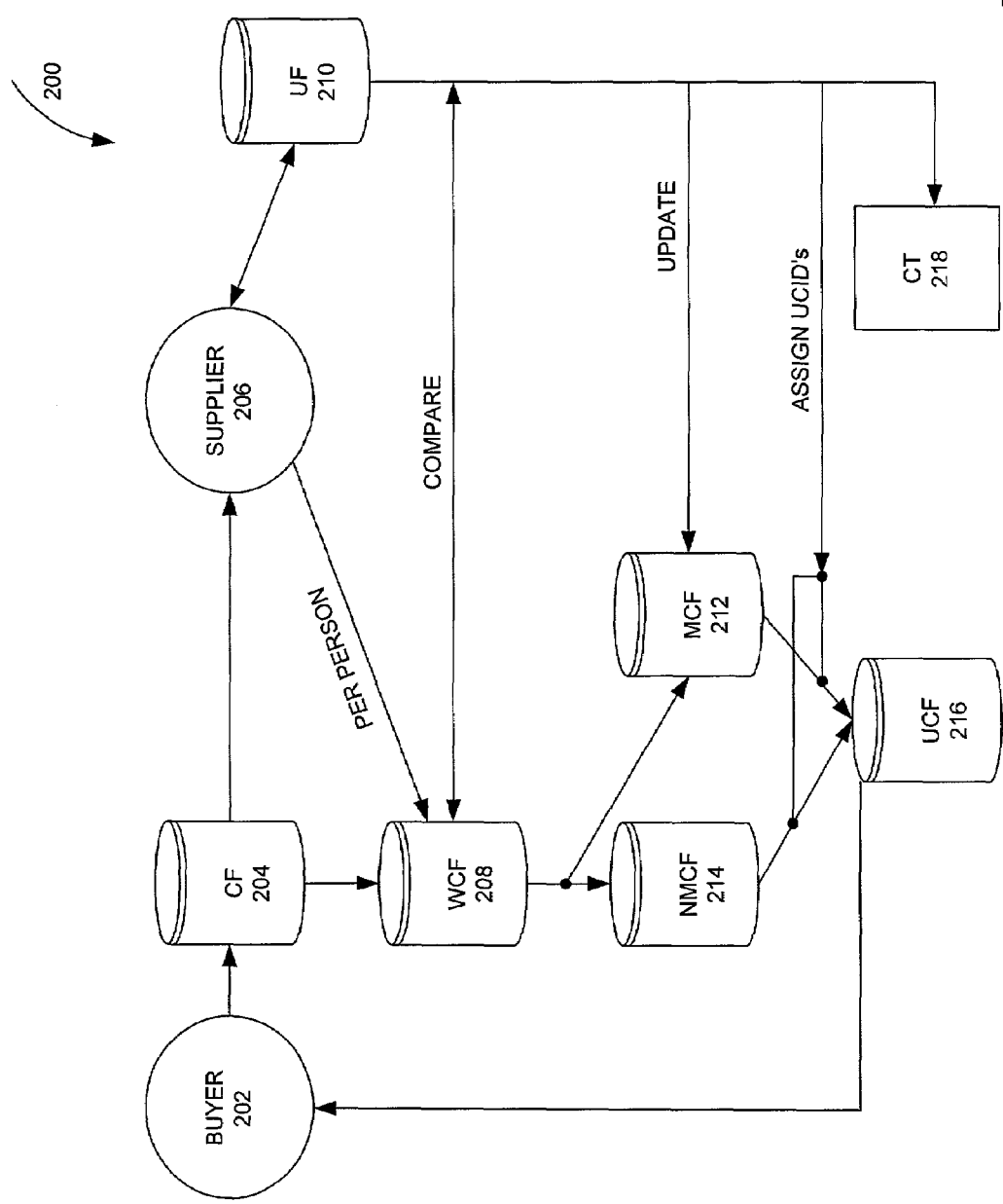
FIG. 2 is an exemplary embodiment of the initial transfer of information from an information supplier to an information buyer according to the principles of the present invention.
Figure 3:
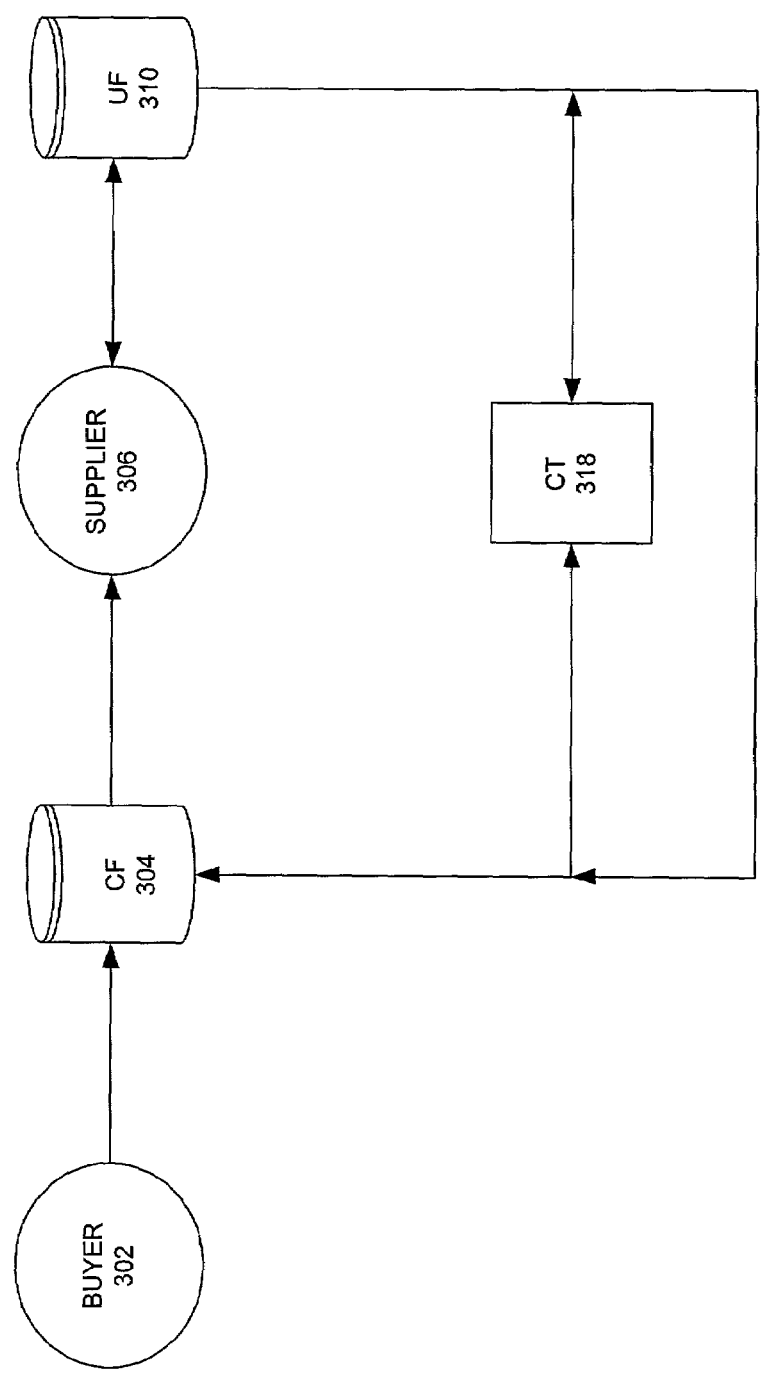
FIG. 3 is an exemplary embodiment of a non-initial transfer of information from an information supplier to an information buyer according to the principles of the present invention.

Referring to FIGS. 2 and 3, a preferred embodiment for transferring information from a supplier's universe file to a buyer's customer file is provided. The process depends on whether each record entry in the customer file was previously assigned with a UCID. In FIGS. 2 and 3, the universe file is illustrated as contained in a single database. Similarly, the customer file is illustrated as contained in a single database. Those skilled in the art will understand that the universe and customer files can be stored in several different databases and memory devices located across different geographical areas. The requirement is that a record entry corresponding to a UUID be accessible regardless of the location and manner by which the record entry is stored. Similarly, a record entry corresponding to a UCID needs to be accessible regardless of the location and manner by which the record entry is stored. A record entry can include a plurality of data files.

Referring to FIG. 2, a process of transferring information when an information buyer provides a customer file which does not have previously assigned UCID's is described. An information buyer 202 provides its CF 204 to a supplier 206 to update record entries contained in the CF 204. In general, the buyer provides the CF 204 to the supplier 206 using storage devices, such as magnetic tapes, CD's or DVD's. However, the CF 204 can be transferred to the supplier 206 via any communicational means, including wired and wireless communications, such as satellite transmissions and the Internet.

In a preferred embodiment, information in the CF 204 is organized per person. Accordingly, upon the receipt of the CF 204, the supplier 206 checks to ascertain the information in CF 204 is organized per person. If the content of the 204 is not organized per person, the supplier reworks the content of the CF 204 such that the content becomes organized per person. The element 208 represents a working customer file ("WCF") whose record entry organization may or may not be the same as that in the CF 204.

The supplier then matches or correlates the content of the WCF 208 with the information contained in the UF 210. The process of matching information contained in two different databases is well known in the art. For example, public domain identity data can be used to match the content of the WCF 208 with the content contained in the UF 210. The result of the matching process, in general, will include a matched customer file ("MCF") 212 and a non-matched customer file ("NMCF") 214. The supplier then updates the content of the MCF 212 according to the specifications of the information buyer 202.

The supplier assigns a UCID to each record entry in MCF, as well as each record entry in NMCF 214. Those skilled in the art will understand that the assignment of the UCID's to the record entries in the CF or files derived therefrom may occur at any time after the CF 204 is delivered to the supplier and preferably before the supplier delivers an updated customer file ("UCF") to the buyer 202. Those skilled in the art will also understand that the MCF 212 and NMCF 214 need not be combined before being delivered to the buyer 202 since the CF 204 may be stored in various formats as long as a UCID can be used for all related data identified as a single record entry.

After assigning a set of UCID's, the supplier creates a conversion table or other desired mapping, linking, associating, or correlating (hereinafter, "associating") functionality to associate the UUID's and UCID's (hereinafter, "CT" or "conversion table") 218. The CT 218 can be used in subsequent transfers of information from the supplier 206 to the buyer 202. The supplier 206 delivers an updated customer file ("UCF") 216 to the buyer 202 via any viable communicational links.

Referring to FIG. 3, a non-initial transfer of information from the supplier 306 to buyer 302 is described. The buyer 302 delivers a CF 304 to the supplier 306. Each record entry should have a corresponding UCID. Using the conversion table created during the initial transfer of information, the supplier 306 can easily identify and update those record entries in the UF corresponding previously matched record entries. The record entries that have not been previously matched with information contained in the UF or record entries that do not have assigned UCID's are matched using the traditional data matching process described in connection with FIG. 2. Iterative transfers of information between an information supplier and an information buyer will result in integration of information contained in the buyer's customer files, and the need to perform expensive traditional data matching process will eventually disappear.

Accordingly, each UCID has a corresponding UUID, that is all record entries in CF 304 will eventually have a corresponding entries in the UF, and the CT 318 is used to translate the UCID's assigned to the CF 304 to the UUID's in the UF. Once the mapping between the content of the CF 304 and the content of the UF 310 is accomplished, the updating of the content of the CF becomes a trivial process. For example, certain information contained in a record entry referenced by a UUID can be simply written over into the record entry referenced by the corresponding UCID. In addition, the information buyer 302 may transmit to the supplier 306 only the UCID's corresponding to record entries the buyer wishes to update. The supplier can supply only a portion of the record entry referenced by the corresponding UUID's. The use of the UUID's, UCID's and CT can eliminate the need to transfer a massive amount of data from an information buyer to an information supplier.

The use of two sets of unique identifiers, i.e., the UUID's for the record entries in the UF and the UCID's for the record entries in a CF provides several advantages. First, it provides a decoupling function that helps to protect security and integrity of different sets of databases. It provides safeguards against inadvertent dilution and contamination of data between the UF and a CF. In addition, the UF contains highly sensitive data, such as credit information and information subject to various federal or local laws. The use of different sets of identifiers for the UF and CF provides a way to control and prudently manage sensitive and/or regulated information. The UCID's cannot be used to ascertain credit or regulated information. Furthermore, an information thief cannot use a set of the UCID's to back trace the source of information. In this sense, the CT acts as a filter or a gateway to isolate the outside world from the UF, unlike the persistent key approach mentioned above.

The UF contains time-sensitive information. The supplier has ability to obtain economic transaction of a person in near real-time basis. Each time a consumer generates an economic event, such as buying a box of chocolates using a credit card, or assuming a mortgage, the supplier has ability to update record entries in its UF. Certain aspects of information regarding a person may be time critical to certain information buyers. The use of the UUID's, UCID's and CT allows capability to provide critical information to an information buyer in near real-time.

Referring to FIG. 4, a transfer of information relating to a consumer referenced by a UCID and the corresponding UUID is described. A UUID 404 references a record entry 420 containing information relating to an entity 402. In general the record entry 420 includes a plurality of data files, commonly designated as 406a through N. When the entity 402 generates events, such as changing her residency and disconnecting her telephone number and utilities, an information supplier receives new raw data regarding the entity 402. The supplier has ability to process the raw data and recognize, for example, the data file 406a containing the address for the person 402 needs to be updated. When the buyer 410a transfers the UCID 412, the supplier finds the corresponding UUID 404 using the conversion table 440. The supplier can also initiate transfer of information regarding the entity 402 when certain information regarded by the buyer 410a to be time-critical becomes updated.

Figure 4A:
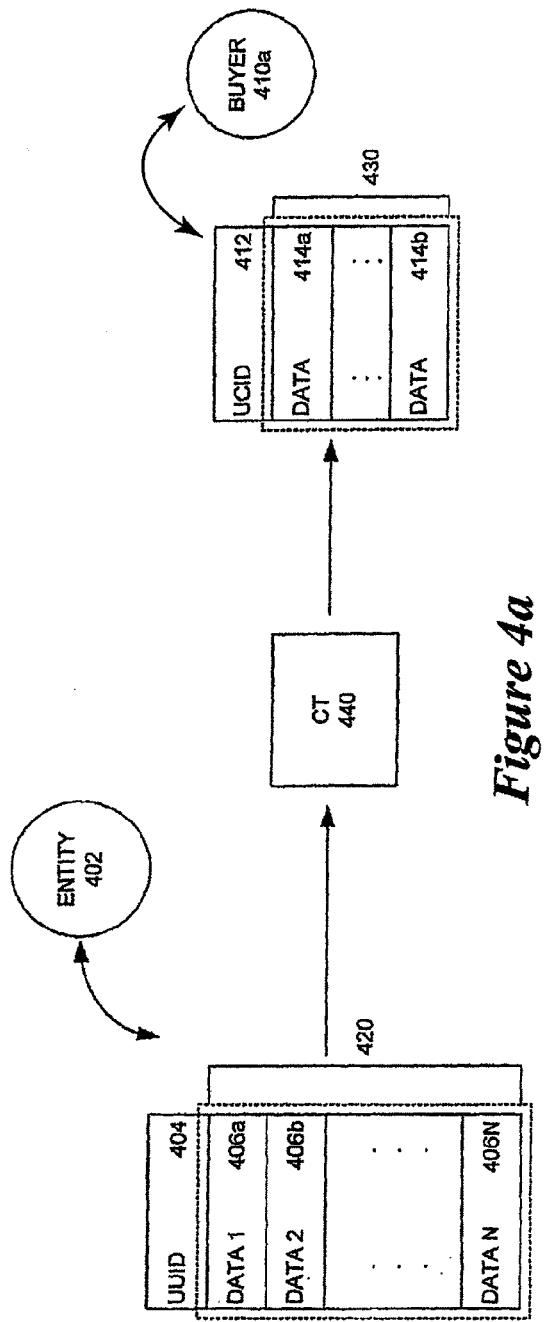
FIG. 4*a* is an exemplary embodiment of a transfer of information relating to a consumer referenced by a UCID and the corresponding UUID.
Figure 4B:
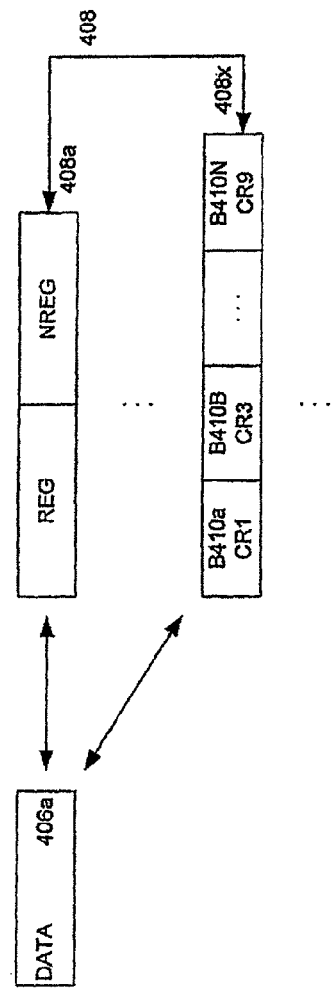
FIG. 4*b* is an exemplary embodiment of a data file associated with a set of attributes.

As illustrated in FIG. 4b, the data file 406a is associated with a set of attributes commonly designated as 408. For example, an attribute 408a specifies whether the data file 406a is regulated or non-regulated. Another attribute 408x specifies the time critical level of the data file 406a for different information buyers. Depending on the attributes associated with the data file 406a, the supplier can transfer in near real-time the updated content of the data file 406a to an information buyer. For example, as illustrated in FIG. 4a, content of data file 406a is non-regulated and time critical to buyer 410a. The supplier can use the UUID 404 and the conversion table 440 to find the corresponding UCID 412. The supplier then can deliver the content of the data file 406a to update the corresponding data file 414a contained in the record entry 430 referenced by the UCID 412. The supplier can provide new time-critical information to the buyer 410a via any real-time methods of communications, including the Internet and wireless communications. Those skilled in the art will understand that a supplier's computer can also overwrite the content of the data file 406a into the data file 414a associated in a buyer's computer using a standard protocol such as Extensible Markup Language ("XML").

The foregoing is provided for purposes of explanation and disclosure of preferred embodiments of the present invention. Further modifications and adaptations to the described embodiments will be apparent to those skilled in the art and may be made without departing from the spirit and scope of the invention and the following claims.

What is claimed is:

1. A method for updating a customer file having a plurality of record entries, comprising:
   receiving raw data corresponding to at least one event generating entity;
   processing the raw data and generating at least one processed record entry;
   storing a plurality of processed record entries in a universe database, each record entry being associated with a unique universe identifier ("UUID");
   accessing content of a customer file;
   comparing the content of the customer file with the content of the universe database;
   generating a matched customer file and a non-matched customer file;
   assigning a unique customer number ("UCID") for each record entry contained in the matched customer file and the non-matched customer file, wherein the UCID is different from the UUID, and the UCID is distributed to a single customer and the UUID is not distributed to the customer;
   associating each UCID with a corresponding UUID via a conversion table; and
   updating a portion of at least one record entry in the matched customer file with information contained in the processed record entry associated with the UUID corresponding to the UCID associated with the at least one record entry.

2. The method of claim 1, wherein each UUID is stable; and each UCID is stable, and the raw data is subject to change.

3. The method of claim 1, wherein a UCID is assigned to every record entry contained in the customer file regardless of whether a record entry corresponds to an existing economic entity.

4. The method of claim 1, wherein the action of comparing the content of the customer file with the content of the universe database comprises organizing the record entries in the customer file per person.

5. The method of claim 1, wherein the action of comparing the content of the customer file with the content of the universe database comprises using public domain identity data common to the customer file and the universe database.

6. The method of claim 1, wherein the action of associating each UCID with a corresponding UUID comprises:
   generating a conversion table providing a mapping between the UCID's with a set of the UUID's contained in the universe database.

7. The method of claim 1, wherein the action of updating a portion of at least one record entry is accomplished using a batch mode.

8. The method of claim 1, wherein the action of updating at least a portion of at least one record entry is accomplished via the Internet.

9. A method for updating a plurality of customer files, each customer file having a plurality of record entries, comprising:
   receiving raw data corresponding to at least one event generating entity;
   processing the raw data and generating at least one processed record entry;
   storing a plurality of processed record entries in a universe database; each Record entry being associated with a universe identifier ("UUID");

comparing content of each of the plurality of customer files with the content of the universe database;

generating a matched customer file and non-matched customer file for each of the plurality of customer files;

assigning a set of unique customer identifiers ("UCID's") for each customer file, each UCID within the set being associated with each record entry contained in the matched customer file and the non-matched customer file corresponding to the set of UCID's wherein the UCIDs are different from the corresponding UUIDs, and the UCIDs are distributed to a single customer while the UUIDs are not distributed to the customer;

associating each UCID with a corresponding UUID via a conversion table; and updating a portion of at least one record entry in at least one matched customer file with information contained in the processed record entry associated with the UUID corresponding to the UCID associated with the at least one record entry.

10. The method of claim 9, wherein each UUID is stable over a period of time; and each UCID is stable over another period of time.

11. The method of claim 9, wherein a UCID is assigned to every record entry contained in each of the plurality of customer files regardless of whether a record entry corresponds to an existing economic entity.

12. The method of claim 9, wherein the action of associating each UCID with a corresponding UUID comprises:

generating a conversion table for each of the plurality of customer files, each conversion file providing a mapping between the set of UCID's assigned to the corresponding customer files with a set of the UUID's contained in the universe database.

13. The method of claim 9, wherein the action of updating a portion of at least one record entry is accomplished using a batch mode.

14. The method of claim 9, wherein the action of updating at least a portion of at least one record entry is accomplished in near real-time via the Internet.

* * * * *